Nov. 11, 1924.  
L. WALDO  
1,515,185  
REDUCTION FURNACE  
Filed May 31, 1923 — 2 Sheets-Sheet 1
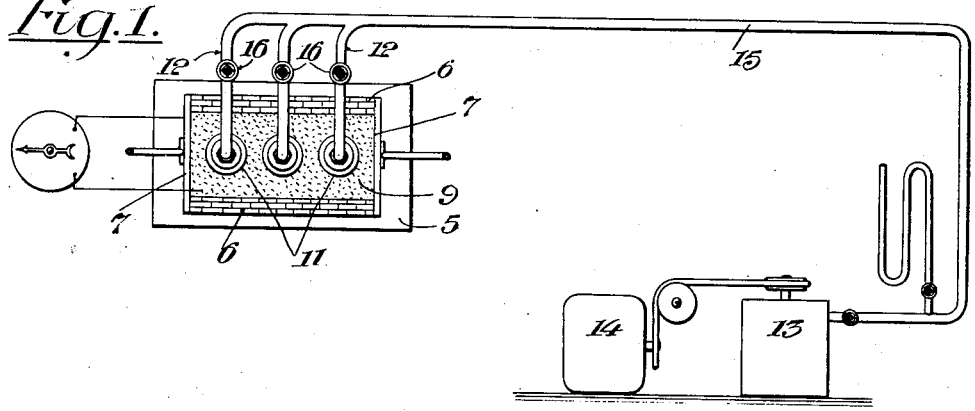
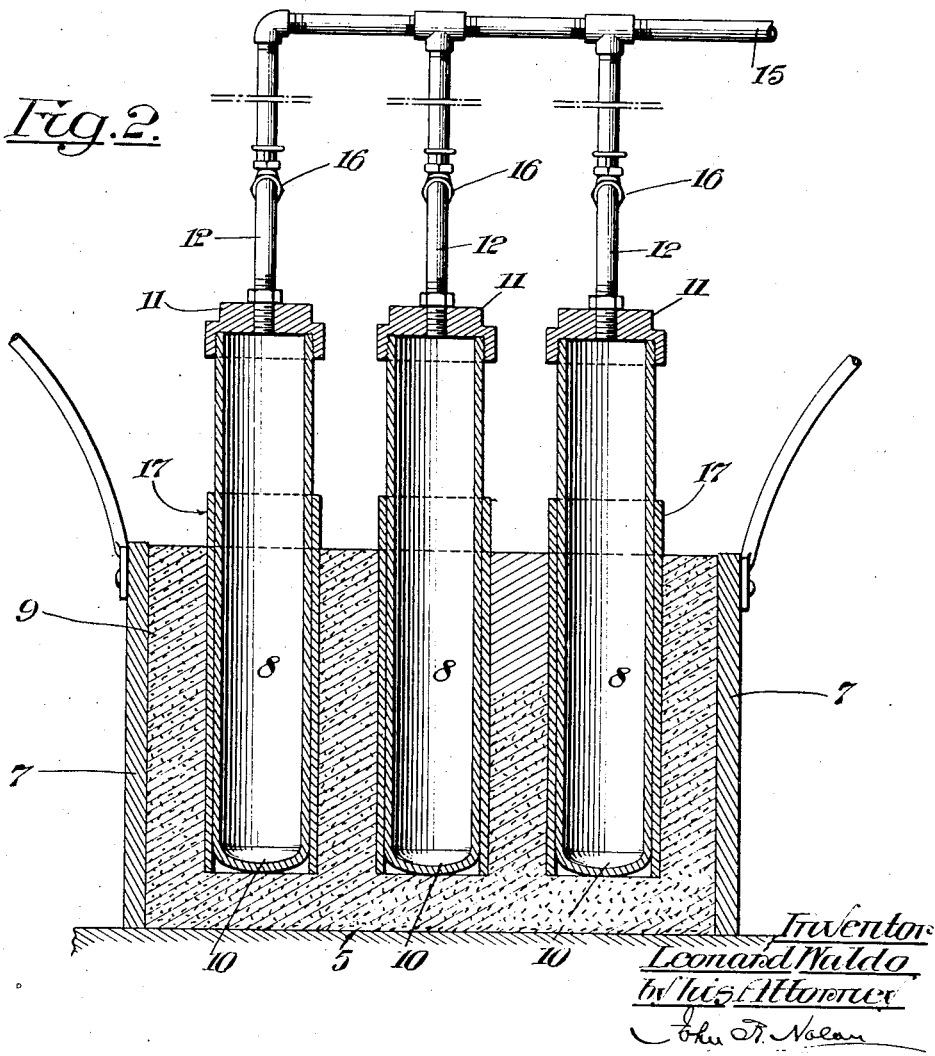

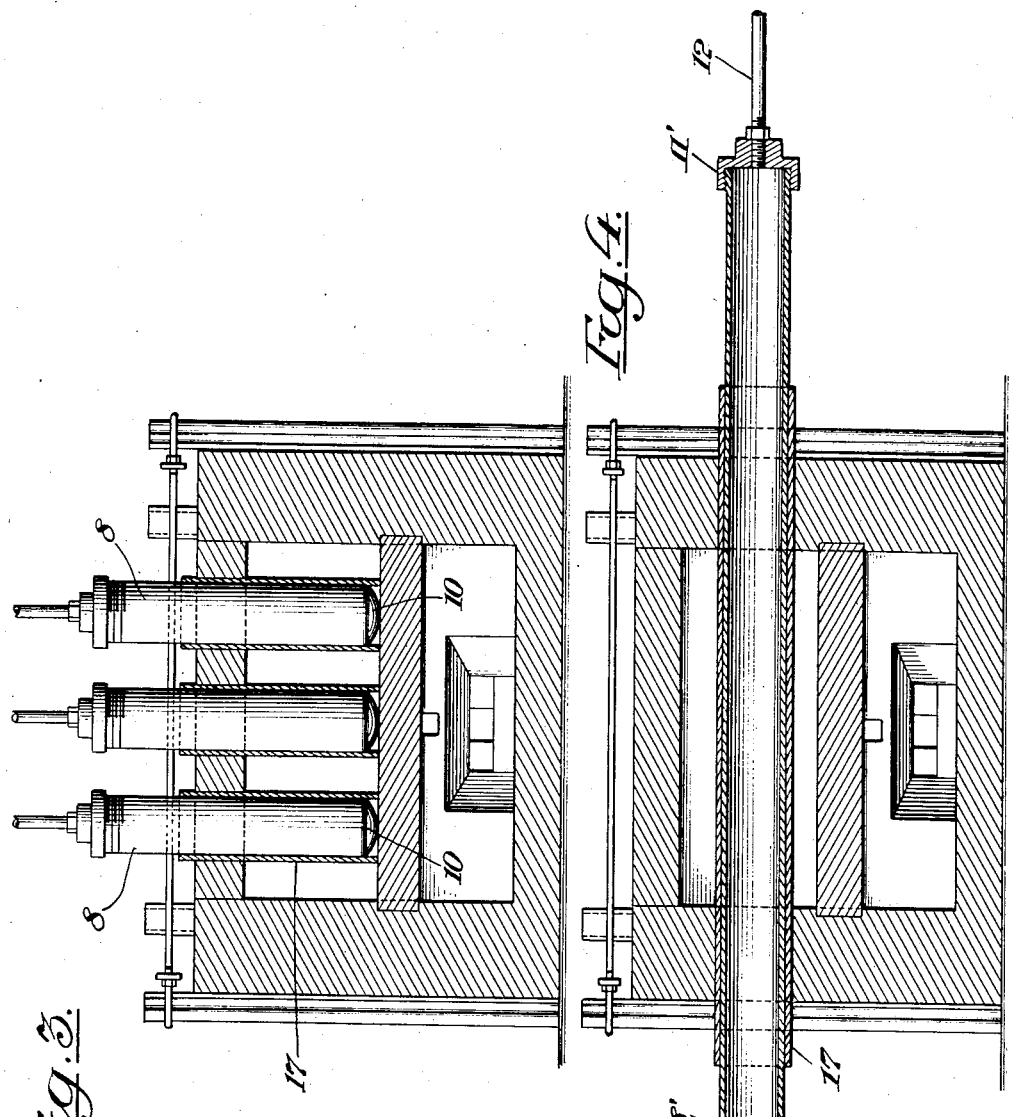

Patented Nov. 11, 1924.

1,515,185

UNITED STATES PATENT OFFICE.

LEONARD WALDO, OF PLAINFIELD, NEW JERSEY.

REDUCTION FURNACE.

Application filed May 31, 1923. Serial No. 642,421.

*To all whom it may concern:*

Be it known that I, LEONARD WALDO, a citizen of the United States, and resident of Plainfield, in the county of Union and State of New Jersey, have invented certain new and useful Improvements in Reduction Furnaces, of which the following is a specification.

This invention relates to a furnace for use particularly though not exclusively, in the operation of reducing magnesium compounds to the metal magnesium in accordance with the process forming the subject of my Letters Patent of the United States No. 1,379,886, dated May 31, 1921, which process comprises the step of subjecting compacted mixtures of magnesium oxide and aluminum to a high degree of heat, in vacuo, with the formation and distillation over the metal magnesium.

In the said patent is illustrated a form of electric furnace for use in carrying out the described process, which furnace includes a heating chamber comprising a tube, preferably of chromel or nichrome, for the reception of a retort which contains the materials to be reduced and is maintained at a high degree of vacuum and at temperatures approaching 1350° C. The furnace indicated is suitable for small plants, but where the process is performed on a large scale it is necessary to provide a furnace having more capacious retorts of such character that the vacuum therein will be maintained at the high temperatures mentioned for relatively longer periods of time.

While the alloy metals, chromel and nichrome, referred to in my previous patent for the construction of the heating chamber are of high melting point, yet when a vacuum retort composed thereof has been in long sustained service under the high temperature conditions mentioned, such metals, being alloys, occasionally show segregation of one or more ingredients with the formation of small areas of eutectics, which, possessing lower fusing points than the remainder of the metallic body, produce, especially at the high temperatures employed, limited porous areas, through which air penetrates under pressure, thus destroying the vacuum in the retort and in other respects militating against the efficiency of the process. Such air is liable to reduce the safety factor of the vacuum on account of the oxygen component of the air in the presence of the hot magnesium, and also because of the absorption of the nitrogen component of the air by the magnesium and the consequent formation of nitride of magnesium.

Owing to the high degree of vacuum in the retort, great external pressure is exerted upon its walls, particularly when the retort is of large capacity, and hence the strength and rigidity of the walls of the retort under the requisite high temperature conditions, is an important consideration.

In the case of a retort composed of iron or low carbon steel the metal assumes a plastic condition below 1000° to 1200° C., and therefore such retort, if employed in a vacuum reducing furnace for the performance of my patented process, would become distorted and soon collapse. Again, magnesium forms alloys with many metals at the heat of fusion, and in consequence the use of such metals for or as a constituent of a vacuum retort for the distillation of metallic magnesium would contaminate the resulting product.

I have discovered that pure nickel possesses all the attributes necessary for the vacuum retort of a reducing furnace at high temperatures, since that metal, being a simple element and having no metallic additions, is incapable of forming areas of eutectics, and since it also has the requisite density, rigidity and stability for relatively large retorts, and is practically neutral to magnesium, under the high temperature and high vacuum conditions required; thus prolonging the life of the retort, increasing its productive capacity in a given time, and generally promoting and insuring the efficient action and result of the reducing process. Therefore, in pursuance of my invention I construct the vacuum retort of pure nickel, which, in the preferred embodiment of the invention, is drawn or rolled from a hot ingot to provide a seamless structure, and I also preferably, though not necessarily, surround the retort with a jacket of highly refractory material, such as carbofrax, which functions to effect an even distribution of the action of the heat throughout the retort and provides a smooth channel for the withdrawal or rotation of the retort tubes under that form of furnace construction. The said retort is employed in an electrical or oil fuel furnace, and provision is had whereby a high degree of vacuum is established and maintained within the retort under the high temperature conditions mentioned; all of which will be hereinafter described and the scope of the invention then be defined in the claims.

In the drawings—

Figure 1 is a diagram of a form of electric resistance furnace and associated elements illustrative of my invention.

Fig. 2 is a vertical section of the said furnace showing the retorts therein.

Fig. 3 is a similar view of a form of oil fuel furnace equipped with retorts embodying my invention.

Fig. 4 is a similar view of an oil fuel furnace equipped with a modified form and arrangement of retort.

The type of furnace illustrated in Figs. 1 and 2 comprises a bottom 5, side walls 6 and positive and negative terminal electrode plates 7, which may be of iron, carbon, or other conducting material, fixed at the respective ends of the side walls, the whole constituting a heating chamber. Within this chamber are contained spaced-apart retorts 8, and resistor packing 9 of kryptol or other form of comminuted carbon. Each of the retorts consists of a seamless cylindrical body having an integral bottom 10 and an open upper end. This end extends some distance above the chamber and is provided with a centrally-perforated detachable head 11 to which is connected one end of a pipe 12 in communication with an exhausting pump 13, preferably of the continuous oil type, driven by an adjacent motor 14. The pump when the parts are assembled, is operated to exhaust the retort and establish therein a high degree of vacuum. In the present instance the retorts are independently connected through their respective pipes 12 to a main pipe 15 leading to the pump, each of the pipes 12 being equipped with a suitable valve 16, whereby communication can be effected and controlled between the associated retort and the pump.

In the employment of the furnace to reduce magnesium oxide to metallic magnesium according to my patented process aforesaid, each of the retorts is partially filled with a charge of compact bodies of mixtures of magnesium oxide and aluminum, so as to leave a condensing space in the outwardly projecting portion of the retort. The head 11 is then applied to the outer end of the retort, and the pump is actuated until the desired high degree of vacuum has been established in the retort. The electric current is then delivered until the contents of the retort are subjected to the action of a temperature approaching 1350° C., in vacuo, which temperature is maintained until the vaporized metallic magnesium resulting from the reaction passes into the condenser space. The Mg deposits itself in crystalline form on the wall of such space, and can subsequently be removed therefrom and then be melted according to known processes of treating magnesium.

As hereinbefore mentioned each of the retorts 8 consists of a seamless integral body of nickel for the reason that such metal insures permanence, rigidity and efficiency in service. To secure the greatest density in the walls of the retort, and so to minimize therein all liability of porosity that might afford leakage of outside air, on account of the internal vaccum, the retort is produced as follows: Hot ingots of nickel are pierced and drawn to retort or cylindrical shape by powerful presses, such, for example, as are used for the production of large ordnance shell cases, or of cylinders for containing gases under pressure, or the hot ingots may be rolled according to the method employed in producing Mannesmann or Stiefel homogeneous tubes. The nickel structure constituting the retort is of substantial thickness, that herein illustrated being one-half inch thick.

In the employment of my hereinbefore described retort under the high vacuum and high temperature conditions hereinbefore mentioned, I have discovered that the action of the heat is more evenly distributed throughout the retort with an enveloping jacket or cylinder 17 of highly refractory material, such as carbofrax.

In Figs. 3 and 4 I have shown the invention as embodied in an oil fuel furnace instead of in an electrical furnace. In Fig. 3 vertically-disposed retorts of the form shown in Fig. 2 are represented, while in Fig. 4 a horizontally disposed retort 8' extending longitudinally of the heating chamber and through the respective end walls of the furnace, is illustrated. The ends of the retort 8' are closed by detachable heads 11, 11' respectively, which receive pipes 12 in communication with the pump. The materials to be treated are delivered to and contained within the portion of the horizontal retort which is confined in the heating chamber of the furnace, the product of distillation passing to the projecting end portions of the retort and being condensed therein. Upon detaching the end heads the deposits can be readily removed from the respective condenser surfaces.

In each of the constructions illustrated in Figs. 3 and 4, the nickel retorts are provided with an enveloping cylinder 17 of refractory material similar to and for the same purpose as in the first described construction.

I claim—

1. In a reduction furnace, a vacuum retort comprising a seamless integral structure of dense, homogeneous nickel of substantial thickness, said structure being stable and non-porous at temperatures upwards of 1000° C., air-exhausting means, and operative connection between said means and the interior of the retort.

2. In a reduction furnace, a retort comprising a seamless integral structure of dense, homogeneous nickel of substantial thickness, said structure being stable and non-porous at temperatures upwards of 1000° C., a jacket of highly refractory material enveloping said retort and separable therefrom, air-exhausting means, and operative connection between said means and the interior of the retort.

3. In a reduction furnace, a heating chamber, a retort therein comprising a seamless structure of dense, homogeneous nickel having an end extending outwardly of the chamber to provide an exterior condenser space, a detachable head on the outer end of the retort, an air-exhausting pump, and operative connection between said pump and the interior of the retort.

4. A retort comprising a seamless integral structure of dense, homogeneous nickel of substantial thickness, means for heating the same to temperatures upwards of 1000° C., and means for producing a high vacuum in said structure.

5. A retort comprising a seamless integral structure of dense, homogeneous nickel of substantial thickness having an outer covering of highly refractory material and being separable from said covering, means for heating the structure to temperatures upwards of 1000° C., and means for producing a high vacuum in said structure.

6. In a reduction furnace, a heating chamber, a vacuum retort therein having a condenser space extending outwardly of said chamber, said retort comprising a seamless integral structure of dense, homogeneous nickel of substantial thickness, and said condenser space having provision to permit the removal therefrom of the metal distillate deposited therein, an air-exhausting pump, and operative connection between said pump and the interior of the retort.

7. In a reduction furnace, a heating chamber, a vacuum retort therein having a condenser space extending outwardly of said chamber, said retort comprising a seamless integral structure of dense, homogeneous nickel of substantial thickness, and said condenser space having provision to permit the removal therefrom of the metal distillate deposited therein, an air-exhausting pump, operative connection between said pump and the interior of the retort, and a stationary jacket of highly refractory material within which the retort is removably supported within the heating chamber.

8. A retort comprising a seamless integral structure of dense, homogeneous drawn nickel, means for heating the same to temperatures upwards of 1000° C., and means for producing a high vacuum in said structure.

9. In a reduction furnace, a heating chamber, a vacuum retort therein having a condenser space extending outwardly of said chamber, said retort comprising a seamless structure of dense, homogeneous mechanically-worked nickel of substantial thickness, and said condenser space having provision to permit the removal therefrom of the metal distillate deposited therein, an air-exhausting pump, and operative connection between said pump and the interior of the retort.

10. In a reduction furnace, a heating chamber, a vacuum retort therein having a condenser space extending outwardly of said chamber, said retort comprising a seamless structure of dense, homogeneous mechanically-worked nickel of substantial thickness, and said condenser space having provision to permit the removal therefrom of the metal distillate deposited therein, an air-exhausting pump, operative connection between said pump and the interior of the retort, and a stationary jacket of highly refractory material within which the retort is removably supported within the heating chamber.

Signed at New York, in the county and State of New York this 29th day of May, A. D. 1923.

LEONARD WALDO.